United States Patent [19]

Shen et al.

[11] Patent Number: 5,707,566
[45] Date of Patent: Jan. 13, 1998

[54] PROCESS FOR PREPARING HIGH PERFORMANCE POLARIZER FILMS

[75] Inventors: Sunny S. Shen, Holmdel; Tze-Pei Tien, Basking Ridge; Hyun Nam Yoon, New Providence, all of N.J.

[73] Assignee: Hoechst Celanese Corp., Somerville, N.J.

[21] Appl. No.: 459,907

[22] Filed: Jun. 2, 1995

[51] Int. Cl.$^6$ ................. B29D 11/00; G02B 5/30
[52] U.S. Cl. ................................ 264/1.34; 252/585
[58] Field of Search ............. 252/585; 264/1.34, 264/1.6, 349

[56] References Cited

U.S. PATENT DOCUMENTS

| | | | |
|---|---|---|---|
| 4,440,541 | 4/1984 | Berke | 264/1.36 |
| 4,810,433 | 3/1989 | Takayanagi et al. | 264/1.34 |
| 4,824,882 | 4/1989 | Nakamura et al. | 524/89 |
| 4,840,640 | 6/1989 | Miura et al. | |
| 4,842,781 | 6/1989 | Nishizawa et al. | |
| 5,059,356 | 10/1991 | Nakamura et al. | 252/585 |
| 5,071,906 | 12/1991 | Tanaka et al. | 524/557 |
| 5,310,509 | 5/1994 | Okada et al. | 252/585 |
| 5,318,856 | 6/1994 | Misawa et al. | 428/524 |
| 5,340,504 | 8/1994 | Claussen | 252/585 |

FOREIGN PATENT DOCUMENTS

| | | |
|---|---|---|
| 0 114 386 A3 | 8/1984 | European Pat. Off. . |
| 0 275 077 A1 | 7/1988 | European Pat. Off. . |
| 0 323 160 A3 | 7/1989 | European Pat. Off. . |
| 0 348 964 A3 | 1/1990 | European Pat. Off. . |
| 63-195602 | 8/1988 | Japan . |

OTHER PUBLICATIONS

Patent Abstracts Of Japan, vol. 12, No. 62 (P–670), 25 Feb. 1988 & JP,A,62 20402.
(Mitsubishi CHEM) & Database WPI, Week 8741, Derwent Publications Ltd., London, GB; AN 87–289507.

*Primary Examiner*—Mathieu D. Vargot
*Attorney, Agent, or Firm*—Palaiyur S. Kalyanaraman

[57] ABSTRACT

This invention provides a novel process to prepare high performance polarizing film. In one embodiment, the process includes melt-blending a film-forming wholly aromatic thermotropic liquid crystalline polyester and a dichroic dye and then extruding the blend at a suitable temperature to yield polarizer films with superior polarizing efficiency and thermal and humidity stability.

20 Claims, No Drawings

PROCESS FOR PREPARING HIGH PERFORMANCE POLARIZER FILMS

BACKGROUND OF THE INVENTION

Polarizers are important components of liquid crystal displays. Liquid crystal displays (LCDs) are widely used components in applications such as, for example, Notebook Personal Computers (PCs), calculators, watches, liquid crystal color TVs, word processors, automotive instrument panels, anti-glare glasses and the like. Typically, polarizers are used in the form of film, the polarizer film (also called polarizing film). In an LCD, the liquid crystal elements are generally sandwiched between two layers of polarizing films which regulate the incident light that enters the liquid crystal producing an on-and-off contrast.

The polarizing film traditionally comprises a stretched polymer film such as, for example, polyvinyl alcohol (PVA), a colorant and other optional layers. The colorant is usually iodine or a dichroic dye that is absorbed on the polymer film. This arrangement may then be coated or sandwiched on both sides with a substrate such as, for example, polyethylene terephthalate (PET), polymethyl methacrylate (PMMA), triacetyl cellulose (TAC), and the like. This may further be coated with an adhesive layer, protective layer, and the like.

The nature and quality of the polarizing film influences the performance of the polarizer as well as the device wherein the polarizing film is used. Traditional polarizing films such as stretched PVA are increasingly found to be inadequate in performance. Their limitations have become apparent with increasingly sophisticated applications for polarizers and LCDs. More and more, the environment for use of these materials is becoming increasingly harsher in terms of temperature, humidity and the like. PVA films lack the needed heat and humidity resistance, strength, dependability, ease of use and ease of processing. Furthermore, they frequently suffer from deterioration of optical properties, such as a decrease in polarizing efficiency when exposed to high humidity/heat environment. Accordingly, improved polarizing films are urgently required to satisfy increasingly sophisticated applications.

Several attempts have been made to improve the quality and performance of polarizer films with limited success. U.S. Pat. Nos. 5,310,509 and 5,340,504 disclose polarizing films based on water-soluble organic polymers such as polyvinyl alcohol and dichroic dyes. U.S. Pat. Nos. 4,824,882 and 5,059,356 disclose polyethylene terephthalate ("PET") films for polarizer applications. U.S. Pat. No. 5,318,856 discloses films of polyvinyl alcohol, polyvinyl formal, polyvinyl acetal and polyvinyl butyral. U.S. Pat. No. 4,842,781 discloses films of polyvinyls, polyester and polyamides. These polymers, however, still have the same disadvantages of PVA, especially in thermal and humidity resistance.

U.S. Pat. No. 5,071,906 discloses a polarizing film comprising a uniaxially stretched PVA having a degree of polymerization of about 2,500–10,000, and a colorant. While this is a slight improvement over traditional lower molecular weight PVA, it still suffers from the disadvantages of PVA. Furthermore, the film will still have to be stretched to achieve orientation.

Some of the problems associated with such polarizing films are due to the way the films are prepared. Since iodine is the traditional colorant, the polarizing film is prepared by a solution dipping process, as stated above. This yields a non-uniformly coated film which offers poor optical characteristics in addition to the poor thermal and hygroscopic stability problems stemming from the PVA polymer. Changing the process would require changing the chemical constituents too. The traditional materials do not offer that flexibility.

Attempts have been made in the recent years to change the materials, one of which is to use a liquid crystal polymeric material instead of PVA. Liquid crystal polymers do not need to be stretch oriented, but can be molded or extruded instead. The process of molding or extrusion generally achieves a high degree of orientation in liquid crystalline polymers. Japanese patent application JP 62-28698 (filed Feb. 10, 1987) discloses a polarizing film consisting of a thermotropic liquid crystal polyester film with a dichroic coloring matter dyed and oriented, wherein the polymer is a copolyester of a hydroquinone derivative (A), a terephthalic acid ingredient (B), an isophthalic acid ingredient (C) and a parahydroxybenzoic acid ingredient, with the molar ratio of A to D being in the range 5:95 to 70:30% and the molar ratio of B to C being in the range 50:50 to 100:0%. The disclosed polymer compositions are difficult or nearly impossible to make. Additionally, the monomer ratios disclosed for those polymers do not necessarily yield a balanced formula for preparing liquid crystalline polymer compositions. Moreover, if even one could make such polymers, any films from such polymers are likely to be substantially deficient in optical transparency, orientation and heat/moisture resistance, which therefore would limit and/or prevent any potential utility as polarizing films, especially in stringent environments.

U.S. Pat. No. 4,840,640 discloses the use of "liquid crystalline polyethylene terephthalate-parahydroxybenzoic acid," formed by copolymerizing a polyethylene terephthalate component (A) with a parahydroxybenzoic acid component (B) with the A:B molar ratio being in the range 40:60 to 5:95. Optical properties are a concern with such compositions. Such compositions have to be first blended with a dichroic acid and then formed into a film through a die at a high shear rate to achieve satisfactory film orientation and transparency. Insufficient transmittance of the light at the wavelength employed would preclude use of films from such polymers for polarizer applications. Perhaps because of such limitations of these "improvements," films based on PVA are still the only ones commercially available for polarizer uses, despite their own disadvantages mentioned earlier.

Accordingly, it is an object of this invention to provide a substantially improved process of preparing polarizing films useful for existing as well as sophisticated applications.

It is another object of this invention to provide an improved process which takes advantage of the moldability/extrudability of liquid crystalline polymers and processability of organic dyes to prepare high performing polarizing films.

It is an additional object of this invention to provide liquid crystal polymer compositions that can be blended with suitable dyes and then formed into films useful for polarizer applications.

It is yet another object of this invention to provide liquid crystalline polymers which can form films with high orientation, optical transparency, moisture resistance and heat resistance with minimal processing needs.

It is a further objective of this invention to provide amorphous liquid crystalline polymers which can be dyed and processed at high temperatures to provide polarizing films with high orientation, dichroic ratio and polarizing efficiency.

SUMMARY OF THE INVENTION

One or more objects of the present invention are accomplished by the inventive process for preparing polarizing films with polarizing efficiency of at least 70% and high thermal and hygroscopic stability. The process comprises: (a) bringing together at least one film-forming, wholly aromatic thermotropic liquid crystal polymer and one or more dichroic dye into a mix; (b) blending said mix at a temperature between 170° C. and the melt temperature of said polymer to make an uniform blend; and (c) extruding or molding said blend in a suitable extruder or molder respectively at temperatures between 170° C. and the melt temperature of said polymer to yield the polarizing film. Since the inventive process involves treatment of the polymer and the dye at temperatures of at least 170° C., both the polymer and the dye must possess sufficient stability at those temperatures. The term "high thermal and hygroscopic stability" refers to the fact that the polarizing film substantially retains its polarizing efficiency when exposed to at least 90° C. temperatures and at least 90% Relative Humidity ("R.H.") for a period of at least 100 hours, i.e., the polarizing efficiency does not drop off by more than 10% (of the initial polarizing efficiency) after the film is exposed to the above-noted environmental conditions.

The polymer is a film-forming, wholly aromatic thermotropic liquid crystalline polymer ("LCP"). The LCP may be a polyester, polyamide, polyesteramide, polyketone, polycarbonate, polyurethane, polyether and the like. Preferred LCPs are polyester and polyesteramide. A preferred liquid crystalline polymer suitable for use in the inventive process comprises repeat units corresponding to the formula:

$$-[P^1]_m-[P^2]_n-[P^3]_q-$$

wherein $P^1$ is an aromatic hydroxy carboxylic acid or an aromatic amino carboxylic acid; $P^2$ is an aromatic dicarboxylic acid; $P^3$ is a phenolic compound; m, n and q represent mole percent of the respective monomers generally ranging from 0–70 mole percent individually, with m+n+q totalling 100 mole %. The preferred value of m is about 0–40%, n is about 0–40% and q is about 0–30%. In addition to $P^1$, $P^2$ and $P^3$, additional monomeric moieties such as, for example, a second aromatic hydroxy carboxylic acid or a second aromatic amino carboxylic acid moiety $-[P^4]_r-$, a diphenol moiety $-[P^5]_s-$, and the like, may be part of the polymer repeat unit, in which case r is about 5–20 mole %, and s is about 5–20 mole %, with the total m+n+q+r+s being adjusted to be 100 mole %. $P^4$ is different from $P^1$ and $P^5$ is different from $P^3$. By suitable choice of monomers for $P^1$, $P^2$, $P^3$, $P^4$ and $P^5$ and for any other additional moieties, as well as their mole percents, and by blending with suitable organic dichroic dyes, the inventive process provides high performing polarizing films for highly sophisticated uses.

DESCRIPTION OF THE PREFERRED EMBODIMENTS

In one embodiment, the present invention discloses polarizing films with high polarizing efficiency and thermal and hygroscopic stability. "High polarizing efficiency" generally refers to polarizing efficiencies of at least 70%. The thermal and hygroscopic stabilities are defined above. The inventive process offers further advantages such as, for example, high orientation and optical clarity. The term "high orientation" refers to orientation of at least 90%. The term "high optical clarity" refers to transmission and is measured by light transmission of at least 30% in the wavelength range 350–750 nm.

The inventive process involves preparing a blend of a suitable liquid crystalline polymer composition and a suitable dichroic dye. There may be present more than one such polymer and more than one such dye in the blend; the description below generally refers to a blend comprising one liquid crystalline polymer and one dye. The liquid crystalline polymer compositions useful in the practice of the present process are film-forming, wholly aromatic thermotropic liquid crystalline polymers which may be liquid crystalline polyesters, polyamides, polyesteramides, polyketones, polycarbonates, polyurethanes, polyethers and the like. Preferred polymer is a film-forming, wholly aromatic thermotropic liquid crystalline polyester or polyesteramide. A typical preferred polymer is characterized by the repeat units:

$$-[P^1]_m-[P^2]_n-[P^3]_q-$$

wherein $P^1$, $P^2$, and $P^3$ are as described above. Examples of $P^1$ include, but are not limited to, monomers such as 4-hydroxy benzoic acid, 2-hydroxy-6-naphthoic acid, 4-aminobenzoic acid, and 4-carboxy-4'hydroxy-1.1'-biphenyl. Examples of $P^2$ include, but are not limited to, terephthalic acid, isophthalic acid, phthalic acid, 2-phenylterephthalic acid, 1,2-naphthalene dicarboxylic acid, 1,4-naphthalenedicarboxylic acid, 2,6-naphthalene dicarboxylic acid and 4,4'-biphenyldicarboxylic acid. Examples of $P^3$ include, but are not limited to, resorcinol, hydroquinone, methyl hydroquinone, phenyl hydroquinone, catechol, 4,4'-dihydroxybiphenyl, and acetaminophen. Additional monomers such as a second hydroxy carboxylic acid or a second amino carboxylic acid moiety $P^4$, a diphenol $P^5$, and the like may also be part of the polymeric repeat unit; $P^4$ is different from $P^1$, and $P^5$ is different from $P^3$. Examples of $P^4$ include, but are not limited to, 4-hydroxy benzoic acid, 2-hydroxy-6-naphthoic acid, 4-amino benzoic acid, and 4-carboxy-4'hydroxy-1,1'-biphenyl. Examples of $P^5$ include, but are not limited to, resorcinol, hydroquinone, methyl hydroquinone, phenyl hydroquinone, catechol, 4,4'-dihydroxybiphenyl and acetaminophen. When there are five such monomers listed above, the monomers $P^1$, $P^2$, $P^3$, $P^4$ and $P^5$ are present in amounts of 0–40, 0–40, 0–30, 5–20 and 5–20 mole percent respectively. Still additional monomers such as, for example a third diphenol, may also be present in the repeat unit in suitable amounts. In selecting monomers and their quantities, care should be taken not to sacrifice the desired properties of the polymer and the intended polarizing film. Suitable choice of monomers and their respective amounts leads to the polarizing films with desired properties.

The invention process may be illustrated by preparation of a blend of a liquid crystalline polyester, hereinafter referred to as "COTBPR" and an organic dye. COTBPR is prepared from the monomers 4-hydroxy benzoic acid ("HBA") for $P^1$, 6-hydroxy-2-naphthoic acid ("HNA") for $P^2$, terephthalic acid ("TA") for $P^3$, 4,4'-biphenol ("BP") for $P^4$ and resorcinol ("R") for $P^5$ in its repeat unit in the ratio 30:30:20:10:10 respectively. Preparation of the LCP composition may be done by any known method. A preferred method to prepare and analytically characterize COTBPR is disclosed in copending patent application, Ser. No. 08/460, 288, now U.S. Pat. No. 5,672,296, filed of even date herewith, as well as in the EXAMPLES section below.

In the process of the invention, the polymer is mixed with colorants and blended. While traditional colorants such as iodine may be used, the colorants preferred for the present process are organic dichroic dyes. Suitable dichroic dyes include, but are not limited to, straight chain dyes, branched dyes, direct dyes, disperse dyes, acidic dyes, solvent dyes and the like. Yellow, orange, blue, purple or red dyes are all suitable. Several classes of suitable dyes are well known to those skilled in the art. They include, but are not limited to azo dyes, anthraquinone dyes, commercially available Disperse dyes such as Blue 214, Red 60 and Yellow 56, direct dyes such as Black 17, 19 and 154, Brown 44, 106, 195, 210, 242 and 247, Blue 1, 15, 22, 78, 90, 98, 151, 168, 202, 236, 249, and 270, Violet 9, 12, 51, and 98, Green 1 and 85, Yellow 8, 12, 44, 86, and 87, Orange 26, 39, 106 and 107, and Methylene violet Bernthsen (available from Aldrich Chemical Company, Milwaukee, Wis.). More than one compatible dye may also be used, if so desired. The term "compatible" refers to the fact that the dye and the polymer are blendable at a range of temperatures including and up to the melt temperature of the polymer, and then the blend moldable or extrudable into an uniform film at temperatures up to and including the melt temperature of the polymer to yield the desired polarizing film wherein the dye molecules are uniformly distributed and the film possesses an initial polarizing efficiency of at least 70%. The choice of suitable dichroic dye or dyes also depends on other factors, as is well known to those skilled in the art. Some such factors include, but are not limited to, light fastness and migration in the polymer. Another desirable property is that the transition moment of the dye and molecule main axes should have the same direction.

In preparing the blend, the polymer and the dye may be physically blended at a suitable temperature, e.g., ambient temperature, and then the film formed from the blend by a suitable method. A more preferred method, however, is to prepare and process the blend at higher-than-ambient temperatures. A still more preferred method is to perform those functions at temperatures in the range between 170° C. and the melt temperature of the polymer. A typical process is to melt-blend a mixture of both the liquid crystalline polymer and the dye at, or near, the melt temperature of the polymer into an extrudable/moldable mixture and then extrude/mold the mixture at a similar temperature into a film. This method yields an uniformly distributed dye in the polymer film. This preferred method is made possible by the uniqueness of the above-described liquid crystalline polymers such as COTBPR which have good thermal characteristics that make them ideally suitable for melt processing operations. Thus, for example, the above-described COTBPR and a suitable dye may be mixed together in a suitable mixer and heated to a suitable temperature, for example at around 200° C. or melt temperature of COTBPR, and then blended thereat to form a well blended mixture. This blend may then be charged into a suitable melt extrusion apparatus, melted and the melt then extruded to a suitable dimension polarizer film. This process has the added advantage that film dimensions can be easily changed by changing the extrusion die accordingly. Instead of extrusion, a molding process may also be employed; extrusion is preferred. The choice of a suitable dye or dyes has relevance in this process of melt blending and extrusion. The process also takes advantage of the high orientation achievable from such liquid crystalline polymers.

Characterization of the inventive polarizer film may be performed by well known methods skilled in the art. Polarizer films prepared according to the present invention have high orientation, high thermal and humidity resistance and also possess excellent optical characteristics such as light transmittance and polarizing efficiency in the wavelength desired. The desired wavelength generally depends on the dye selected. In a typical experiment, for example, a COTBPR film prepared as described above was melt-blended with Methylene Violet Bernthsen dye at about 240° C. and the blend was then melt extruded at temperatures above 200° C. to form a polarizer film. Optical properties of this film including polarizing efficiency were measured according the procedure described in U.S. Pat. No. 5,071,906 cited above. The film had a blue color with transmittance of about 40% and a polarizing efficiency of about 93% in the wavelength region 550–630 nm. Even after subjecting this film to an environment of 100° C. and 95% R.H. for about 120 hours, the polarizing efficiency stayed at about 92%, with virtually no change. For comparison, two commercially available polarizer films, one based on PVA and iodine and the other based on PVA and a dichroic dye, were tested under the same conditions. The polarizing efficiencies of these comparative films dropped off either totally or substantially after exposure to the above-noted heat/humidity environment, demonstrating the superior optical properties and thermal/ humidity resistance of the polarizer films prepared by the inventive process to conventional polarizer films.

In addition to offering polarizers with superior properties, the present process allows one to tailor-make polarizer films to suit different wavelengths. This is done by appropriately selecting the dye or dyes. The preferred process is a melt extrusion; no solvents are generally needed. Because of this advantage, the dye incorporation and distribution are tend to be much more uniform than in a solution-dipping process. Furthermore, the extrusion temperatures can be easily adjusted to suit different dyes and polymer compositions. Thus the inventive process is much more versatile than the conventional methods of preparing polarizer films. Additionally, the present invention advantageously offers superior devices based on the inventive polarizer films.

The following EXAMPLES are provided to further illustrate the present invention, but the invention is not to be construed as being limited thereto.

EXAMPLES

Example 1

Preparation of COTBPR:

This example illustrates the preparation of COTBPR polyester from a 1 mole reaction mixture of 4-hydroxy benzoic acid ("HBA"), 6-hydroxy-2-naphthoic acid ("HNA"), terephthalic acid ("TA"), 4,4'-biphenol ("BP"), and resorcinol ("R") in the ratio 30:30:20:10:10.

To a 500 ml 3-neck flask equipped with a half-moon shaped TEFLON® stirrer blade, gas inlet tube, thermocouple, a Vigreux column attached to a condenser and receiver were added the following:

a) 41.440 grams of 4-hydroxy benzoic acid (0.3 moles);

b) 56.456 grams of 6-hydroxy-2-naphthoic acid (0.3 moles);

c) 33.226 grams of terephthalic acid (0.2 moles);

d) 18.600 grams of 4,4-biphenol (0.1 moles);

e) 11.012 grams of resorcinol (0.1 moles); the flask was immersed in an oil bath and provided with means to accurately control the temperature. The flask was thoroughly purged of oxygen by evacuation and then flushed with nitrogen three times, and slowly heated in the oil bath; and f) 0.02 grams of potassium acetate was added as a catalyst along with 105.48 grams of acetic anhydride (2.5% excess). Acetic acid began to distill over and was collected in a graduated cylinder.

The contents of the flask were heated while stirring at a rate of 2000 rpm to 200° C. over a period of 60 minutes at which time 10 ml of acetic acid had been collected. The reaction temperature was then gradually raised at a rate of about 1° C./min to 320° C. at which time 96 ml of acetic acid had been collected. The flask was heated at 320° C. for another 60 min. A total of 110.5 ml of acetic acid had been collected. The flask was then evacuated to a pressure of 1.0 mbar at 320° C. while stirring. During this period the polymer melt continued to increase in viscosity while the remaining acetic acid was removed from the flask. The flask and its contents were removed from the oil bath and were allowed to cool to the ambient temperature. Polymer was then removed from the flask and a total of 120 grams of polymer was obtained.

The resulting polyester had an inherent viscosity (IV) of 2.0–2.4 dl/g as determined in a pentafluorophenol solution of 0.1 percent by weight concentration at 60° C. and a melt viscosity (MV) of 550 poise at a shear rate of 103 $\sec^{-1}$ measured at 230° C. in a capillary rheometer using an orifice of 1 mm diameter and 30 mm length.

When the polymer was subjected to differential scanning calorimetry (10° C./min heating rate), it exhibited a glass transition temperature (Tg) of 106° C. When the polymer was examined by hot-stage cross-polarized optical microscopy, it has a transition temperature from solid to liquid crystalline ($T_{s-lc}$) at 170° C. The polymer melt was optically anisotropic.

Examples 2–14

Following the procedure outlined in Example 1, the following additional variants of the COTBPR composition were prepared having different proportions of the five ingredients noted above for COTBPR. Composition, glass transition temperature, melt temperature ($T_m$, defined as the peak of a melt endotherm shown in differential scanning calorimetry) and I.V. for the compositions appear in Table I below. Unless otherwise indicated, properties were measured as in Example 1. Table II lists polymers (EXAMPLES 15–22) which are not variants of COTBPR since they include additional monomers ("X" in Table II) or exclude some monomers of COTBPR ("--" in Table II).

TABLE I

| Example | HBA:HNA:TA:BP:R | Tg °C. | Tm °C. | $T_{s \to lc}$ °C. | I.V. (dl/g) |
| --- | --- | --- | --- | --- | --- |
| 1 | 30:30:20:10:10 | 106 | none | 170 | 2.5 |
| 2 | 20/30/25/15/10 | 108 | none | 280 | 2.74 |
| 3 | 30/20/25/15/10 | 107 | none | 275 | 2.12 |
| 4 | 40/10/25/15/10 | 106 | none | 255 | 1.96 |
| 5 | 30/10/30/20/10 | 111 | none | 280,385 | 2.64 |
| 6 | 20120/30/20/10 | 108 | none | 350,385 | 2.74 |
| 7 | 10/30/30/20/10 | 113 | none | 290,400 | 2.48 |
| 8 | 20/30/25/10/15 | 113 | none | 160 | 2.10 |
| 9 | 20/30/25/5/20 | 122 | none | 163 | 1.76 |
| 10 | 35/35/15/10/5 | 107 | 179 | 135 | 4.14 |
| 11 | 30/40/15/10/5 | 107 | 190 | 145 | 3.30 |
| 12 | 20/40/20/15/5 | 109 | 226 | 125 | 3.34 |
| 13 | 30/30120/15/5 | 109 | 233 | 155 | 2.68 |
| 14 | 20/30/25120/5 | 112 | 301 | 250 | 3.93 |

TABLE II

| Example | HBA:HNA:TA:BP:R:X | X |
| --- | --- | --- |
| 15 | 25/35/20/—/—/20 | Phenyl hydroquinone |
| 16 | 30/30/20/—/—/20 | Phenyl hydroquinone |
| 17 | 30/30/20/20/—/10 | Phenyl hydroquinone |

TABLE II-continued

| Example | HBA:HNA:TA:BP:R:X | X |
| --- | --- | --- |
| 18 | 30/30/20/—/10/10 | Phenyl hydroquinone |
| 19 | 30/30/20/7/7/6 | Phenyl hydroquinone |
| 20 | 25/35/20/—/—/20 | Methyl hydroquinone |
| 21 | 30/30/20/10/—/10 | Methyl hydroquinone |
| 22 | 30/30/20/—/10/10 | Methyl hydroquinone |
| 23 | 30/30/20/5/10/5 | Acetaminophen |

Example 24

Preparation of dye blended COTBPR by melt blending:

60 grams of the COTBPR from Example 1 and 0.3 gram of Methylene Violet Bernthsen (from Aldrich Chemical Co., Milwaukee, Wis.) were charged into the mixing chamber of a Haake Mixer (Model #3042309 from Haake Company, Paramus, N.J.). The mixing ball and its contents were heated to 240° C. over about 30 minutes and then the charge was blended at a rotational speed of 100 rpm for 10 minutes at the temperature. The mixture of polymer and dye was removed from the ball and allowed to cool to the ambient temperature.

Example 25

Extrusion of film and measurement of properties:

20 grams of the dyed polyester from Example 24 was compacted into a rod of ⅜ inch diameter. The rod was charged into the melting section of a micro fiber spinning unit (designed for internal use by Hoechst Celanese Corporation, Summit, N.J.). The polymer was melted and fed at a rate of 0.56 g/minute into a melt chamber. A slit die was located at the end of the melt chamber through which the polymer melt was extruded. The dimensions of the slit were ¼ inch by 5 thousandths of an inch. The extruding film was taken up by a take-up roll. During the spinning, the heater temperature was maintained at 230° C., the melt chamber temperature at 230° C. and the die temperature 235° C. The take-up speed of the film was 5 m/minute. The melt drawdown ratio, defined as the ratio of the take-up speed to the exit speed of the extruding film at the die exit, was 9. The width of the tape was 0.2 inches and the thickness 0.5 thousandths of an inch.

The obtained polarizing film had a blue color, a transmittance of 40%, and a polarizing efficiency ("polarizing coefficient") of 93% for light in the wavelength region 550–630 nm, as measured following the procedure detailed in U.S. Pat. No. 5,071,906 cited above. This polarizer film was allowed to stand in a temperature-humidity-controlled oven at 100° C. and 95% R.H. for 120 hours and the polarizing coefficient was determined again. The polarizing coefficient was found to be 92%, showing little change.

For comparison, the polarizing efficiencies (or polarizing coefficients) of two commercially available polarizing films, one based on PVA film and iodine (NPF-G1220DV from Nitto Denko Corporation, Japan) and the other based on PVA and a dichroic dye (NPF-Q-12 from Nitto Denko Corporation), were similarly determined. The two commercial films originally had polarizing efficiencies 99.95% and 88%, respectively. After being allowed to stand in a temperature-humidity-controlled oven at 100° C. and 95% R.H. for 120 hours, the films showed significantly lowered polarizing efficiencies of 0% and 40%, respectively, demonstrating thereby that the polarizer films prepared according to the process of the present invention underwent far less degradation in their polarizing efficiency at 100° C. and 95% R.H., compared with conventional polarizing films.

What is claimed is:

1. A process to prepare a polarizing film, which film possesses a polarizing efficiency of at least 70%, said process comprising: (a) bringing together at least one film-forming, wholly aromatic thermotropic liquid crystalline polyester and one or more dichroic dye into a mix; (b) blending said mix at a temperature between 170° C. and the melt temperature of said polymer to make an uniform blend; and (c) extruding said blend in a suitable extruder at a temperature between 170° C. and the melt temperature of said polymer to yield the polarizing film, wherein said polyester comprises repeat units corresponding to the formula:

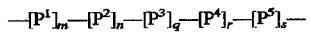

wherein $P^1$, $P^2$, $P^3$, $P^4$ and $P^5$ represent monomeric moieties, with $P^1$ being an aromatic hydroxy carboxylic acid, $P^2$ being an aromatic dicarboxylic acid, $P^3$ being a phenol, $P^4$ being a second aromatic hydroxy carboxylic acid moiety different from $P^1$, and $P^5$ being a second phenolic moiety different from $P^3$, and m, n, q, r and s represent mole percent of the respective monomers individually with $P^1$ and $P^2$ in the range 5–40 mole percent, $P^3$ in the range 5–30 mole percent, and $P^4$ and $P^5$ in the range 5–20 mole percent.

2. The process of claim 1, wherein $P^1$ is selected from the group consisting of 4-hydroxy benzoic acid, 2-hydroxy-6-naphthoic acid, and 4-carboxy-4'-hydroxy-1,1'-biphenyl.

3. The process of claim 1, wherein $P^2$ is selected from the group consisting of terephthalic acid, isophthalic acid, phthalic acid, 2-phenylterephthalic acid, 1,2-naphthalenedicarboxylic acid, 1,4-naphthalenedicarboxylic acid, 2,6-naphthalene dicarboxylic acid and 4,4'-biphenyldicarboxylic acid.

4. The process of claim 1, wherein $P^3$ is selected from the group consisting of resorcinol, hydroquinone, methyl hydroquinone, phenyl hydroquinone, catechol, 4,4'-dihydroxybiphenyl and acetaminophen.

5. The process of claim 1, wherein said $P^5$ is a diphenol selected from resorcinol, hydroquinone, catechol, 4,4'-dihydroxybiphenyl, bisphenol-A and acetaminophen.

6. The process of claim 2, wherein $P^1$ is 4-hydroxy benzoic acid.

7. The process of claim 2, wherein $P^1$ is 2-hydroxy-6-naphthoic acid.

8. The process of claim 3, wherein $P^2$ is terephthalic acid.

9. The process of claim 4, wherein $P^3$ is resorcinol.

10. The process of claim 4, wherein $P^3$ is 4,4'-dihydroxybiphenyl.

11. The process of claim 1, wherein said $P^4$ is 4-hydroxy benzoic acid.

12. The process of claim 5, wherein said $P^5$ is resorcinol.

13. The process of claim 1, wherein said dye is selected from the group consisting of straight chain dye, branched dye, direct dye, disperse dye, solvent dye and acidic dye.

14. The process of claim 1, wherein said dye is selected from the group consisting of azo dyes, anthraquinone dyes, Disperse Red, Blue 214, Red 60, Yellow 56, Black 17, 19 and 154, Brown 44, 106, 195, 210, 242 and 247, Blue 1, 15, 22, 78, 90, 98, 151, 168, 202, 236, 249, and 270, Violet 9, 12, 51, and 98, Green 1 and 85, Yellow 8, 12, 44, 86, and 87, Orange 26, 39, 106 and 107, and Methylene violet Bernthsen.

15. The process of claim 14, wherein said dye is an anthraquinone dye.

16. The process of claim 1, wherein said blend is prepared at about the melt temperature of said polymer and said extrusion is performed at about the melt temperature of said polymer.

17. A process to prepare a polarizing film, which film possesses a polarizing efficiency of at least 70%, said process comprising: (a) bringing together at least one film-forming, wholly aromatic thermotropic liquid crystalline polyesteramide and one or more dichroic dye into a mix; (b) blending said mix at a temperature between 170° C. and the melt temperature of said polymer to make an uniform blend; and (c) extruding said blend in a suitable extruder at a temperature between 170° C. and the melt temperature of said polymer to yield the polarizing film, wherein said polyesteramide comprises repeat units corresponding to the formula:

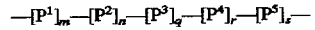

wherein $P^1$, $P^2$, $P^3$, $P^4$ and $P^5$ represent monomeric moieties, with $P^1$ being an aromatic amino carboxylic acid, $P^2$ being an aromatic dicarboxylic acid, $P^3$ being a phenol, $P^4$ being an aromatic hydroxy carboxylic acid, and $P^5$ being a second phenolic moiety different from $P^3$, and m, n, q, r and s represent mole percent of the respective monomers individually with $P^1$ and $P^2$ in the range 5–40 mole percent, $P^3$ in the range 5–30 mole percent, and $P^4$ and $P^5$ in the range 5–20 mole percent.

18. The process of claim 17, wherein $P^1$ is 4-aminobenzoic acid.

19. A process of preparing a polarizing film which film possesses a polarizing efficiency of at least 70%, said process comprising: (a) bringing together at least one film-forming, wholly aromatic thermotropic liquid crystalline polyester and one or more dichroic dye into a mix; (b) blending said mix at a temperature between 170° C. and the melt temperature of said polymer to make an uniform blend; and (c) molding said blend in a suitable molder at temperatures between 170° C. and the melt temperature of said polymer to yield the polarizing film, wherein said polyester comprises repeat units corresponding to the formula:

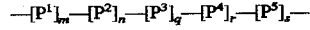

wherein $P^1$, $P^2$, $P^3$, $P^4$ and $P^5$ represent monomeric moieties, with $P^1$ being an aromatic hydroxy carboxylic acid, $P^2$ being an aromatic dicarboxylic acid, $P^3$ being a phenol, $P^4$ being a second aromatic hydroxy carboxylic acid moiety different from $P^1$, and $P^5$ being a second phenolic moiety different from $P^3$, and m, n, q, r and s represent mole percent of the respective monomers individually with $P^1$ and $P^2$ in the range 5–40 mole percent, $P^3$ in the range 5–30 mole percent, and $P^4$ and $P^5$ in the range 5–20 mole percent.

20. The process of claim 19, wherein said blending and said molding are performed at the melt temperature of said polymer.

* * * * *